United States Patent [19]

Stamnitz

[11] Patent Number: 4,952,012
[45] Date of Patent: Aug. 28, 1990

[54] ELECTRO-OPTO-MECHANICAL CABLE FOR FIBER OPTIC TRANSMISSION SYSTEMS

[76] Inventor: Timothy C. Stamnitz, 168 Witham Rd., Encinitas, Calif. 92024

[21] Appl. No.: 272,571

[22] Filed: Nov. 17, 1988

[51] Int. Cl.$^5$ ............................................... G02B 6/44
[52] U.S. Cl. .................................................. 350/96.23
[58] Field of Search ...................................... 350/96.23

[56] References Cited

U.S. PATENT DOCUMENTS

| 4,199,224 | 4/1980 | Oestreich | 350/96.23 |
|---|---|---|---|
| 4,239,336 | 12/1980 | Parfree et al. | 350/96.23 |
| 4,367,917 | 1/1983 | Gray | 350/96.23 |
| 4,504,112 | 3/1985 | Gould et al. | 350/96.23 |
| 4,606,604 | 8/1986 | Soodak | 350/96.23 |
| 4,651,917 | 3/1987 | Gould et al. | 228/173.5 |
| 4,759,487 | 7/1988 | Karlinski | 228/17.5 |
| 4,763,981 | 8/1988 | Wilkins | 350/96.23 |
| 4,832,443 | 5/1989 | Cameron et al. | 350/96.23 |
| 4,840,453 | 6/1989 | Kitayama | 350/96.23 |
| 4,848,868 | 7/1989 | Rohner | 350/96.23 |

FOREIGN PATENT DOCUMENTS

| 51-99032 | 9/1976 | Japan . | |
|---|---|---|---|
| 63-149612 | 6/1988 | Japan | 350/96.23 |
| 84-00820 | 3/1984 | PCT Int'l Appl. . | |
| 1453402 | 10/1976 | United Kingdom . | |
| 2010528 | 6/1979 | United Kingdom . | |
| 2154334 | 9/1985 | United Kingdom . | |
| 2213960 | 6/1989 | United Kingdom . | |

Primary Examiner—Frank Gonzalez
Attorney, Agent, or Firm—Harvey Fendelman; Thomas Glenn Keough

[57] ABSTRACT

An electro-opto-mechanical cable includes at least one thinwall steel alloy tube containing at least one single mode fiber and a void filling gel to assure the capability for transmitting low-noise optical phase data. A dielectric annulus and an electrically conductive layer disposed therein helps further assure watertight integrity and power or electrical signal transfer. An optional double-layer contrahelical or three or four layer, torque balanced, steel wire strength member provides additional protection as well as capability to be towed, deployed and recovered from the seafloor at abysmal depths. The steel armor and cable core interface eliminates all intersticial spaces associated with the armor wires to produce a firm, hard cable that experiences minimal residual strain (creep) due to extensive load cycling. A pressure extruded outer jacket aids in assuring the protection of the individual steel wires from point loadings and from strength degradation due to corrosion. Further, the integral steel armor and jacketing structure provides protection for the electro-optic core from abrasion against rock or coral at cable suspension points during sustained cable strumming.

14 Claims, 7 Drawing Sheets

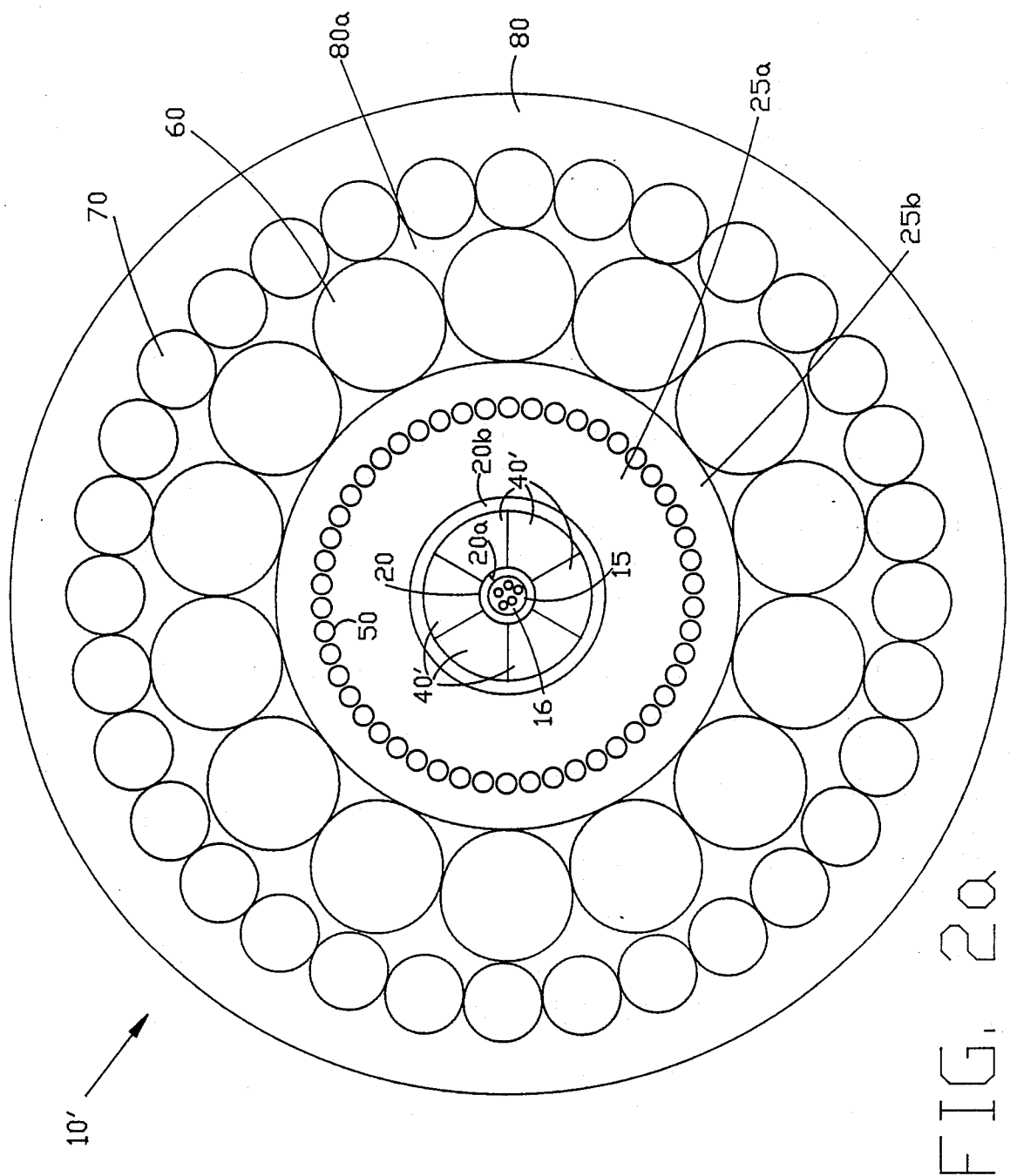

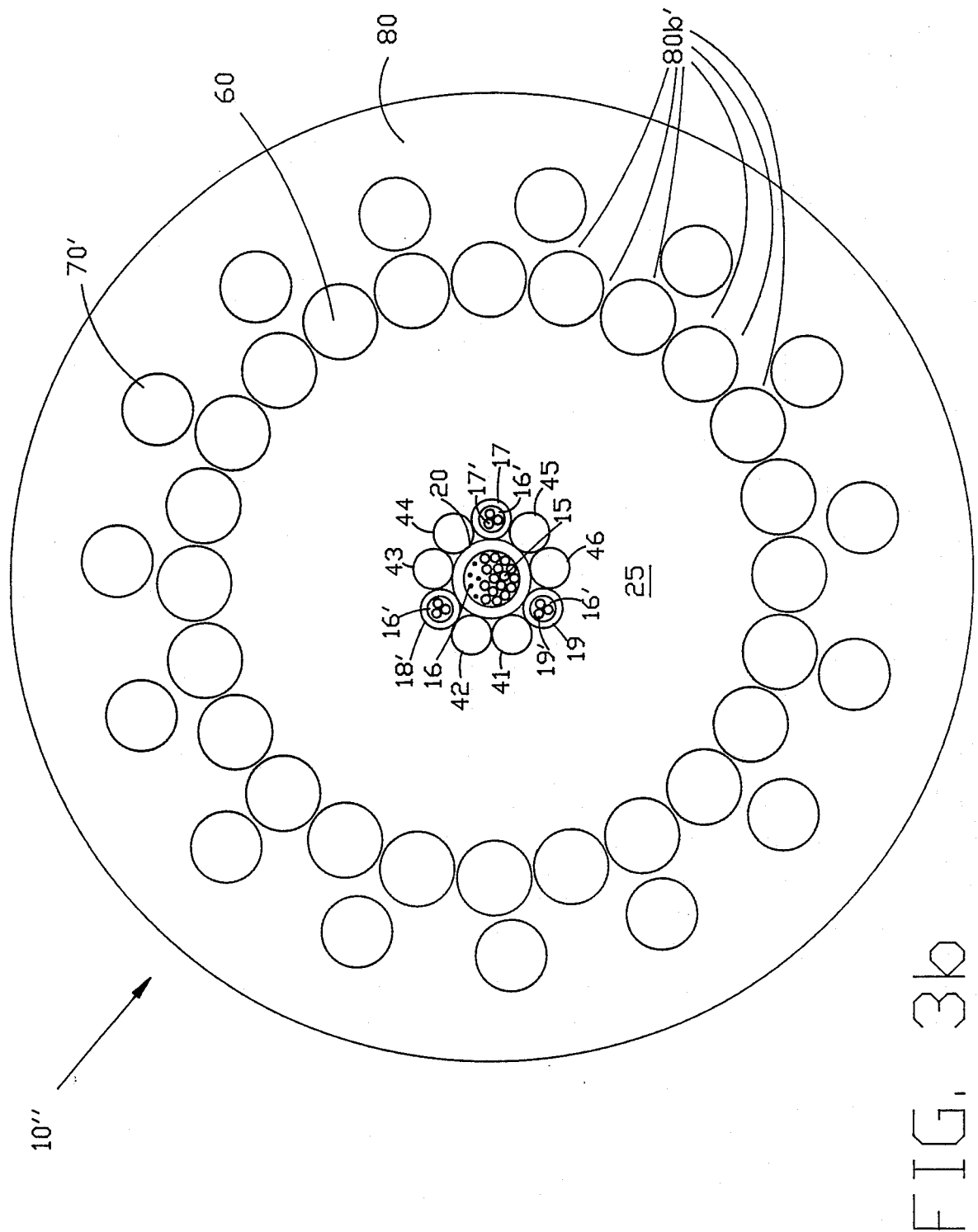

ELECTRO-OPTO-MECHANICAL CABLE FOR FIBER OPTIC TRANSMISSION SYSTEMS

STATEMENT OF GOVERNMENT INTEREST

The invention described herein maybe manufactured and used by or for the Government of the United States of America for governmental purposes without the payment of any royalties thereon or therefore.

BACKGROUND OF THE INVENTION

Prior art optical fiber communication cable includes four distinct generic constructions or arrangements of the electrical, optical, and mechanical elements to achieve the required respective performance functions. In the first approach the optical fibers are placed into a system of polymeric tubes cabled about a central strength member core, or into a radial system of chambers in the form of a helix about a central steel strength member. In a second generic approach, the fibers are encapsulated into a polymeric matrix which is enclosed within a composite system comprised of steel strength member wires and a relatively large diametered, thick-walled tubular copper conductor. The steel wires and the tubular copper conductor are always adjacent and in contact. The third generic approach attempts to incorporate optical fibers into existing electromechanical cable structures by providing a tight-buffer; i.e., added strengthening and jacketing of the individual fibers, such that they may be handled and processed on an equal footing with insulated electrical conductors. This method is known as the hybrid design approach. The fourth and most recent generic approach utilizes a copper alloy tube which is improved with respect to providing a smaller diameter for encapsulation of the optical fibers and placement of the synthetic fiber strength member in an outermost annular region of the cable cross-section.

The first generic type of cable configuration is exemplified by the U.S. Pat. No. 4,143,942 (Anderson, dated 3/13/79) and U.S. Pat. No. 4,199,224 (Oestreich, dated 4/22/79). In the former patent, a fiber or a multiplicity of fibers are enclosed within a polyacrylonitrile sheath, and as many as six of these units are in turn cabled about a central, synthetic fiber (i.e., KEVLAR/du Pont) strength member core. No electrically conductive path is provided. In the latter patent (#4,199,224) the cabled bundle is replaced by a radial system of chambers that are helical extruded and appear as radial "ribs" in the transverse cable cross-section. One or more optical fibers are placed in the chambers formed by the helical ribs which are formed directly over the central steel wire strength member. Insulated electrical conductors are placed in a layer over the system of chambered fibers, then covered by polymeric tapes and an external jacket.

The second generic type of optical fiber communication cable is represented by the Mondello U.S. Pat. No. 4,156,104 (5/22/79) and the Parfree and Worthington U.S. Pat. No. 4,239,336 (12/16/80), intended for use as optical fiber submarine cables. In the former patent (#4,156,104) the fibers are captured in an annular region of extruded elastomer around a central steel "king-wire." A maximum of twelve fibers are thus enclosed in an approx 0.102" overall diameter (OD). The latter is surrounded by at least two layers of unidirectional steel stranding, which is jacketed with a copper tube pulled down over the steel strand and swaged into the outermost interstices of the outer layer of steel wires to obtain positive mechanical contact. The latter is covered with an electrical grade dielectric of polyethylene to 0.827" OD. This extrusion represents the only physical/mechanical protection for the electro-optic functions of the cable. Similarly, the Parfree and Worthington fiber optic cable invention (#4,239,336) contains a composite steel strength member and thick-walled tubular electrical conductor adjacent to each other and enclosing a number of optical fibers along with a polymeric filler material in the center of the cable. In contradistinction to the Mondello cable invention, a dual-system of relatively large diametered, thick-walled copper tubes is formed in two processing operations over the optical fibers, and the resulting unit is surrounded with two contrahelical layers of steel wire strength members in direct contact with the outer surface of the tubular electrical conductor. This composite tubular conductor is then extruded with an electrical grade of polyethylene to a diameter greater than 0.850 inches. Again, the latter extrusion represents the only protection for the electro-optic functions of the cable.

Several problems have been recognized from actual experience with optical fiber submarine cable constructed as just described. One major problem concerns the vulnerability of the cable to sharkbite, abrasion, and anchor dragging. All of the cable manufactured previously has now been provided with additional copper alloy tube shielding over the dielectric and an outer jacket of high-density polyethylene to a diameter over 1.00". The cable diameter reduced correspondingly the total continuous length of cable that could be carried by the cable laying ship. There is now great economic and strategic interest in defining a fiber optic submarine cable that provides both improved survivability and a reduced transportation volume; for example, it is desired to provide a cable with diameter $\leq 0.500$ inches.

Prior art in fiber optic tow cables and ROV umbilical cables utilized variations of traditional EM cables to incorporate tight-buffered optical fiber elements on an equal footing with insulated electrical elements into the cable structure. A tight-buffer implies the fiber optics are individually strengthened and jacketed with various synthetic yarns, or steel wires, or composite glass/epoxy directly over and in contact with the primary/secondary buffer on the "as manufactured" optical fiber. (For a review of the pertinent methods and associated diameters for the individual fiber units see "Small-Diameter, Undersea, Fiber Optic Cable", T. Dohoda and T. Stamnitz, *Proc. DOD Fiber Optics '88*, McClean, Va., 23 Mar. 88; for a review of the generic ROV and tow cable configurations incorporating these units see "Fiber-Optic Tether Cable for ROV's", *Proc. DOD Fiber Optics '88*, McClean, Va. 23 Mar. 88; for a historical view on placing fiber optics into EM tow cable and ROV applications see, "Development and Design of Underwater Cable", T. Stamnitz, *Sea Technology*, Vol. 25, No. 7, pg. 29-33, July 1984).

While the hybrid approach for incorporating optical fibers into EM cables proved fruitful for the transmission of digital optical data, a growing need became apparent for a true electroopto-mechanical tow cable or ROV umbilical having a reduced diameter to reduce hydrodynamic drag forces. At the same time, a requirement for a large number of fibers within a small diameter tow cable has developed. This same requirement cannot be satisfied by fibers having the tight-buffered configuration.

The fourth and most recent generic configuration for an undersea, fiber optic cable is disclosed in U.S. Pat. No. 4,763,981 issued to G. A. Wilkins (8/16/88). Based upon a relatively smalldiametered copper tube for encapsulation of the optical fibers, Wilkins achieves the potential for a significant cable diameter reduction, while providing a synthetic strength member outside the dielectric to serve as armoring protection for the electrooptic functions of the cable. The copper alloy tube element, unfortunately, could not be manufactured reliably and profitably such that this product is not available at the present time. In addition, requirements have arisen for undersea tow cables and long-haul submarine cables that require more fibers than can be provided in the Wilkins approach, and require a greater specific gravity than can be obtained using synthetic strength members.

Currently a need is recognized for the development of fiber optic cables having the capability to preserve optical phase and/or polarization data during the transmission between signal source points and remote monitoring (sink) points. This need becomes more acute when fiber optic sensors systems and coherent fiber communications systems must operate in an undersea environment, since transmissions must be made from various depths, and particularly, from extreme depths to signal processors at sea level. A difficult problem associated with fiber optic sensor technology concerns the high degree of sensitivity of the "downlead" optical fiber (contained in the connecting cable), which must apparently be exposed to the environmental parameter to be measured. For example, in the case of fiber optic interferometric hydrophones, optical fiber leads are used to interconnect the undersea sensor array to a remote processing sink in order eliminate need for optical-electronic conversion and the electrical transmission of collected data through long electro-mechanical (EM) cables. The latter EM cables have the disadvantage of insufficient bandwidth, excessive losses and/or excessive diameter and weight. On the other hand, use of polarization preserving fiber or special low birefringent fiber is usually unaffordable. Furthermore, it is difficult in hybrid fiber optic cable design which incorporates standard telecom fiber to protect the fiber from exposure to the undersea acoustic environment. Further, it is more difficult to prevent an increase in background phase noise induced by dynamic mechanical stresses associated with the operational tow environment. Thus, a continuing need exists in the state of the art for a reduced diameter electro-opto-mechanical cable configuration that incorporates a large number of fibers capable of preserving optical phase and/or polarization data during transmission through the fibers, while simultaneously transmitting electrical power and withstanding the physical demands of an undersea tow cable environment or a dynamic seafloor environment.

SUMMARY OF THE INVENTION

The present invention is directed to providing an undersea fiber optic transmission cable that includes a central, flexible electro-optic strand configuration containing a high fiber count (up to ~100 or more), and having the capability for assuring simultaneously the transmission of low-noise phase modulated or polarization modulated lightwave carrier data and electrical power, while the cable is subjected to high stress physical and mechanical environments. A central thin-walled tubular member extends longitudinally in the axis of the cable and is made from certain metalic alloys having a resistance to radial inward deformation yet possessing a capability for longitudinal flexure. The central thin-walled member is shaped with an outer diameter equal to a multiple of about ten times the dimensions of its wall thickness and has a longitudinal welded seam to provide a hermetically sealed interior. At least one optical fiber is longitudinally disposed in the interior of the central thin walled tubular member, although a multitude, as many as twenty or more fibers could still be so disposed. A gel fills the interior of the central thin walled tubular member which contains the optical fibers to remove any voids therein and to provide mechanical coupling of the fiber to the inside of said metal tube. An annular shaped dielectric region coaxially adjacent the central thin walled tubular member and at least a pair of contrahelical, torque balanced layers of load bearing strands are disposed radially outwardly of the dielectric layer. Typically a steel alloy material used for the central thin walled member prevents the transmission of fiber-damaging heat to the optical fibers as the longitudinal welded seam precisely is created by a laser. The steel alloy also protects the optical fiber from asymmetric lateral deformation and other effects that might generate phase noise superimposed upon optical phase data propagating therethrough. Optionally a served electrically conductive layer of round copper wires or shaped copper strands is interposed within the dielectric layer to provide for electrical power transfer throughout the length of the cable. Also, a high density polyethylene jacket covers the torque balanced layers of steel armor to help assure a more complete watertight integrity as well as presenting an abrasion resistant surface. The central electro-optic strand may be constructed with additional thin-walled tubular members fashioned like the central thin-walled tubular member clustered about and extended longitudinally the full length of the cable in helical paths about the central thin-walled member. Additional optical fibers are provided in each of the additional thin-walled tubular members and each member containing fiber is provided with an appropriately calculated back twist during the helical stranding operation to assure the transmission of phase modulated optical data without introducing any phase distortion due to torsional stress in the fiber. A gel fills each of the additional thin walled tubular members to further reduce the possibilities of compromising the data content and to provide frictional coupling of the fibers to the cable structure. In another variation, several solid or stranded electrical conductors may be alternately interposed with the additional thin-walled tubular members, and all such elements having the same diameter, then clustered about the central thin-walled tubular member to obtain the ability to transmit electrical power and additional channels for optical data transmission throughout the length of the cable. An additional served conductive layer formed typically with round copper wires, can be included in the dielectric region to function as a ground shield or as a return lead for electrical power and/or signal transmission.

An object of invention is to provide an improved cable for the transmission of phase modulated optical data.

Another object is to provide an improved cable having a steel alloy thin-walled metal tube containing optical fibers and a void filling gel to provide frictional coupling to assure transmission of phase modulated optical data.

Still another object is to provide an electro-optomechanical cable having the capability for transmitting phase modulated and/or polarized optical data along with electrical power for a number of interconnected instrumentations.

Still another object is to provide for a cable having fiber optics contained in a thin-wall tubular member surrounded by an annular dielectric region and at least a pair of contrahelical, torque-balanced layers of load bearing strands.

Still further an object is to provide an integrated cable construction capable of providing electrical, optical, and mechanical functions simultaneously, which is suitable for deployment in an undersea environment.

Yet a further object is to provide a cable having the capability for transmitting phase modulated and/or polarization data which includes sufficient contrahelical, torque-balanced strength membered windings to enable towing through the water.

Still another object of the invention is to provide a cable including at least one small-diametered thin-walled metallic tube in which fibers are protected from asymmetric transverse stress and radial compressions that might alter the shape of the fibers and consequently alter their indexes of refraction, so that coherent optical phase/polarization data can be transmitted without superimposed noise.

Yet another object is to provide a cable having a thin-walled metal tube containing fibers and void fill gel to provide for frictional coupling of the fibers to the metal tube and to avoid fiber buckling from excess axial compression that might arise from mismatch of the temperature coefficients of expansion of the fiber and polymer materials used in cable construction.

A further object of the invention is to provide a cable having a coaxial thin-walled tube containing at least one optical fiber and a void filling gel both contained within an annular shaped dielectric region and contrahelical torque-balanced load bearing strands which together have the capability to be stowed on a reel or in the hold of a ship for subsequent deployment without adversely affecting the optical data transmission.

A further object of the invention is to provide a cable having load bearing members to allow it to be towed through the water without compromising the effectiveness of optical fibers and allowing the inclusion of served electrical conductors for the transmission of power to remote monitoring instrumentations and to provide an integrated electro-opto-mechanical design.

An object of the invention is to provide a cable with a small-diameter thin-walled steel alloy tube containing fiber optics and void filling gel that is hermetically sealed with a longitudinal weld without the creation of heat level that might otherwise damage the contained optical fibers.

Another object is to provide a cable having an integrally extruded jacket and load bearing layers to achieve a ruggedness which resists the effects of abrasion, fishbite, and high tension cycling over small sheaves or overboarding chutes and minimizes residual (creep) strain due to sustained axial loading.

These and other objects of the invention will become more readily apparent from the ensuing specification, when taken in conjunction with the appended claims and drawings.

BRIEF DESCRIPTION OF THE DRAWINGS

FIGS. 2 and 2a show variations of this inventive concept.

FIG. 3b depicts a variation that enhances coilability.

DESCRIPTION OF THE PREFERRED EMBODIMENTS

Figure 1:
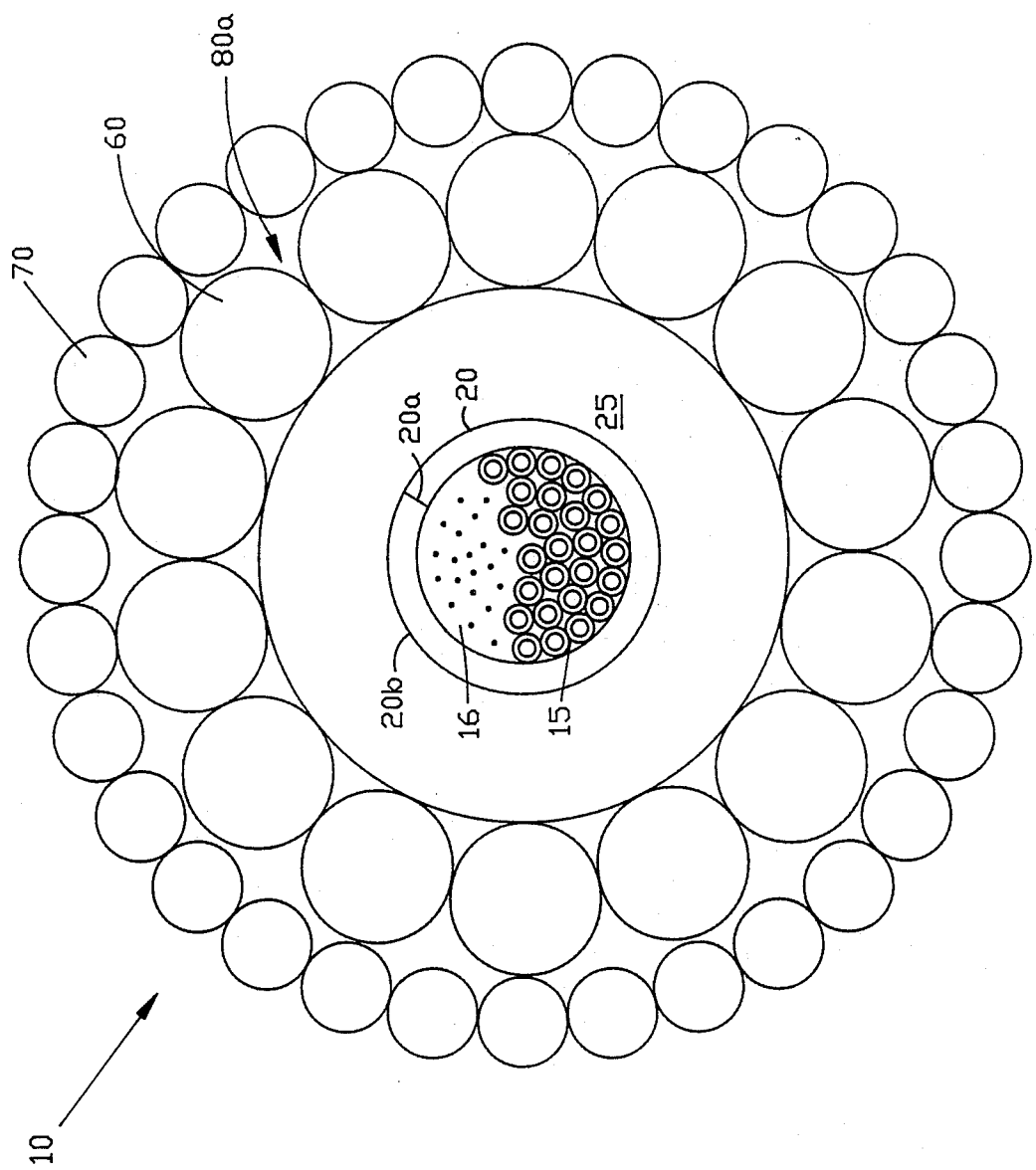
FIG. 1 depicts a representative embodiment in crossection of the cable for transmitting phase and/or polarization modulated data.
Figure 2:
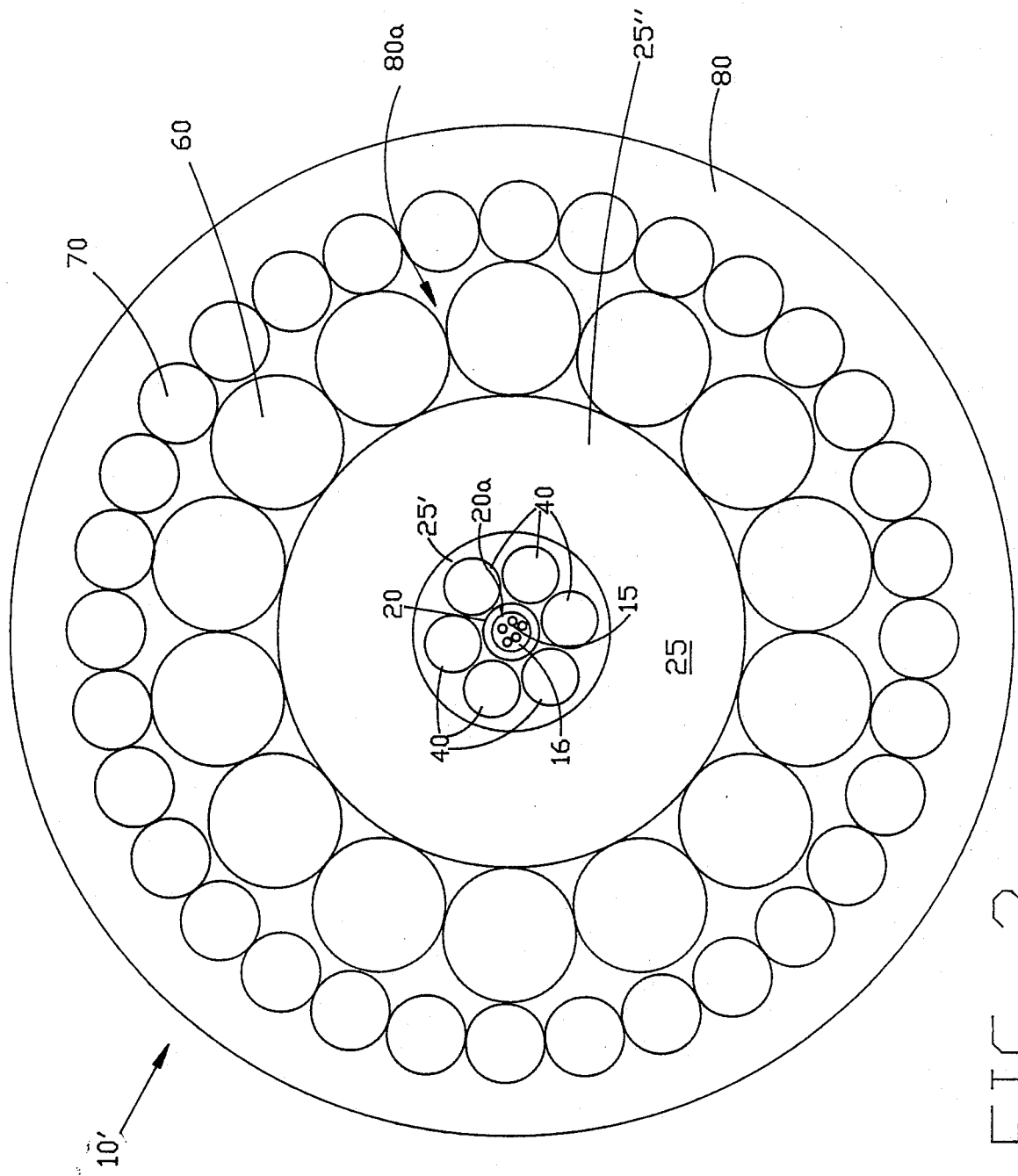
Figure 3:
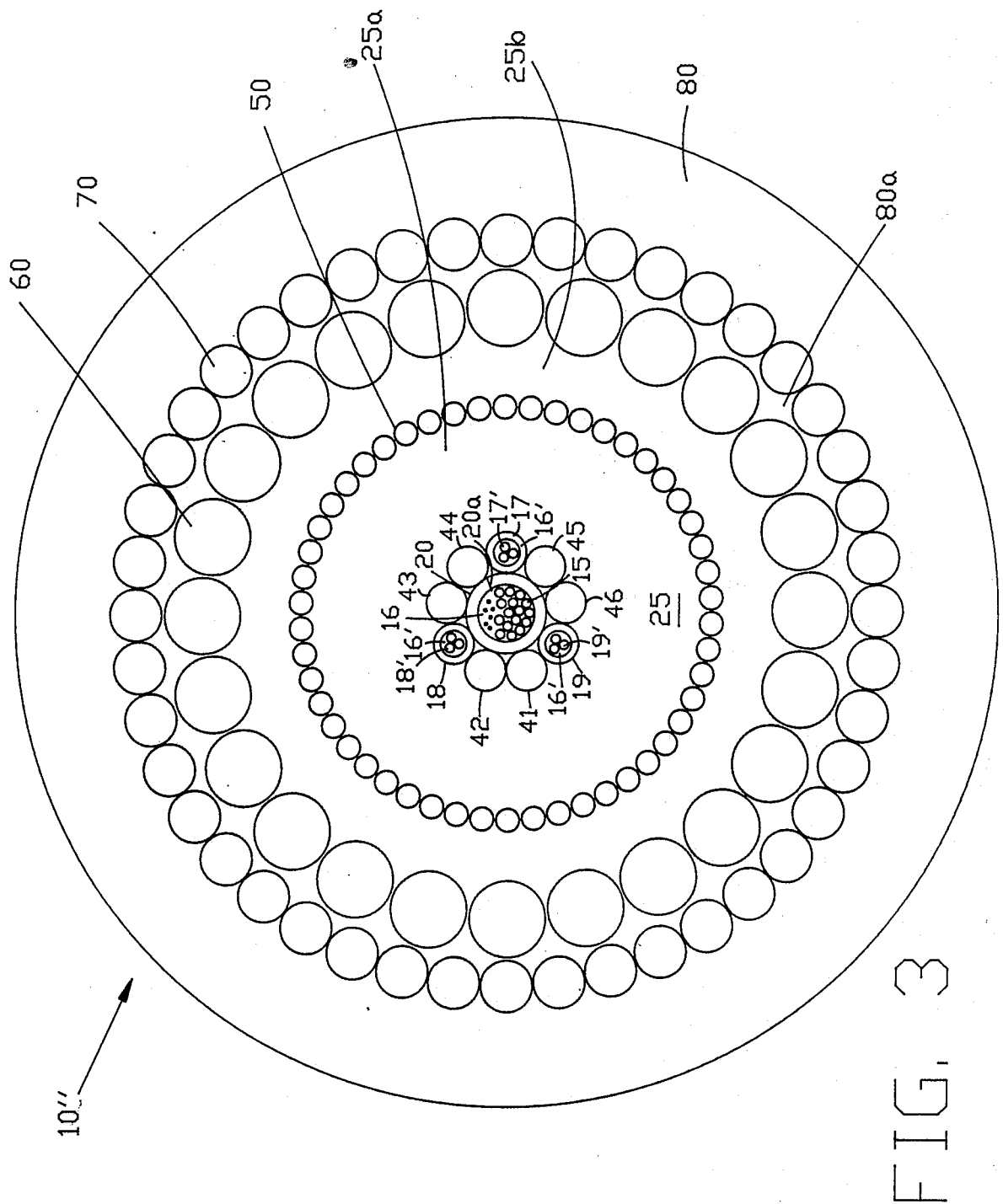
FIG. 3 shows a cross-sectional view of another embodiment of the cable that assures transmission of optical phase and/or polarized modulated data.

Referring now to the drawings, FIGS. 1, 2, and 3 show respectively cables 10, 10', and 10" specifically designed to assure the transmission of optical phase modulated and/or polarization data over long distances. These designs and their variations provide a sufficiently static environment for one or more single-mode fibers in the context of static or dynamic tow operations to allow detection of optical phase data and polarization data. Reduction in phase noise as compared to a conventional hydrid fiber optic cable construction has been verified. The electro-opto-mechanical (EOM) cable invention avoided most problems associated with previous designs and provided a heretofore unrealized optical data capability.

An interferometric fiber optic hydrophone array is connected to one end of a cable and the other end of the cable is secured to a towing vessel. Usually phase coherent light is launched from a laser source and transmitted to the optical fiber forming an interferometric sensor in the array. Light is appropriately modulated by an impinging acoustic signal and is returned from the modulation zone via another fiber to be detected. Since the signal imposed phase modulation occurs by means of optical path length changes that result from axial strain in the fiber sensor, any additional changes in strain in the lead fiber cable will also engender optical path length differences. Another factor to consider is that the distribution of radial compressive stress on the lead fiber in the tow cable generates random dynamic deformation of the fiber refractive index ellipsoid. Dynamic radial compressive forces arise from armor squeeze, the combined effect of Poisson's ratio and radial components of the helical steel wire stress associated with fluctuations in cable tension.

Depending on the cable geometry itself, in particular, the location of fibers with respect to the adjacent components, internal compressive forces on the fiber will be either symmetric or asymmetric. In the former, refractive index changes will not be catastrophic with respect to phase demodulation. In the case of dynamic transverse compressive strain, the fiber will be deformed into elliptical cross-sections with dynamically changing eccentricities. The corresponding changes in refractive index induce a dynamic state of polarization in the transmitted light (dynamic stress birefringence). These strain induced phase noises superimposed upon phase data in the tow cable fiber constitute the lead-sensitivity problem avoided by the design of the cables of this invention.

If an all-fiber Mach-Zehnder interferometer configuration is deployed for either a towed or static application, the fiber interferometer has equal signal and reference arms to minimize the effects of laser diode phase noise. With homodyne detection, the required quadrature bias (90 percent imbalance) is maintained by modulation feedback voltage to a reference piezoelectric cylinder used in recovering the impinging acoustic signals. The impinging acoustic energy imparts a phase modulation to the light, which is the quantity of interest to instrumentation on a remote signal processing site or onboard the towing platform.

Unwanted optical phase shifts can be induced in both the reference and sensor arms of the interferometer and the lead fiber connected to the remote sensor due to changes in the optical path length of light propagating through a particular segment of fiber. The basic birefringence changing mechanisms that could impose stresses on the individual fibers in the cable environment include not only mechanical stresses but also temperature stresses, magnetic field and electric field stresses. Of these stresses the mechanical stresses generated by external cable loading predominates in the towing situation.

A thorough analysis of the stresses and problems associated with cable designs for undersea operations in particular is set out in detail in the article entitled "Cable design approach for partial solution of lead sensitivity problems in undersea fiber optic sensor systems", T. C. Stamnitz, *PROC.INT'L.SYMP.TECH.OPTOELECTRONICS: Optical Devices in Adverse Environments*, SPIE/ANRT, Cannes, France, 19 Nov. 1987 (11 pages).

Because of the considerations outlined above and thoroughly covered in the cited article, it is obvious that the optical fibers in a cable must be protected from asymmetrical transverse stress. In addition, reduction of fiber axial elongation to the lowest possible level is desirable for minimal fiber fatigue degradation and improved fiber cable life. As the consequence, the cable designs 10, 10' and 10" evolved and can be built in continuous lengths of 10 to 100 kilometers, but may be fabricated from a number of smaller segments appropriately spliced together.

A number of single mode fibers 15 is located substantially coincident with cable axis. The exact selection of single mode fibers having the desired transmission properties for long-haul, high-data rate transmission can be made in accordance with various operating conditions. Some considerations in making a selection might include avoidance of microbending loss associated with the buffer package, pure bending loss associated with cable deployment and retrieval operations, splice losses due to core offset, etc. Other factors for fiber selection might include the required repeater spacing and the bit rate. In view of the present availability of a large variety of single-mode fibers from a relatively large number of different manufacturers, many fibers could be used once the parameters of the sensing system, monitoring circuitry, deployment mode and the like are considered in a given application and under given operational conditions. The optimum parameters for the single-mode fiber structure, such as core radius and index difference, must be determined for each situation, since optical performance characteristics depend upon the fibers opto-geometric parameters in a complicated manner. Trade-offs with respect to the performance requirements must be made. For example, a high index difference will provide a relative insensitivity to bending and microbending loss but induces at the same time relatively greater intrinsic loss. Similarly, control of the fiber index profile provides control over fiber dispersion at given wavelengths, which determines maximum data rates at these wavelengths. In the final analysis, the success of optical data transmission in a given cable in accordance with this invention will depend upon proper choice of opto-geometric parameters in the fiber. It must be pointed out that this invention provides, however, due to the configuration and arrangement of other elements to be described, a considerable number of fibers. Over a hundred may be included by having up to twenty-four fibers 15 in a given thin-walled tubular member 20.

The small-diameter thin-walled tubular member 20 is preferably an alloy such as stainless steel type 304, 316, Inconel 625or titanium. The walls of the tubular member are thin and can have a wall thickness of 0.002" to 0.004". The tubular members are typically sized between 0.030" to 0.065" OD. These dimensions provide a rather spacious interior for a number of fibers 15 and the remaining void space in the tube interior is filled with a thixotropic gel 16, which is sufficiently viscoelastic to prevent water from flowing axially through the interior of the tube in the event of cable severing. Inclusion of the gel in addition to preventing any damage to the optics or end equipment, provides sufficient viscosity to effect frictional coupling of the fibers to the thin-walled tubular member.

The tubular members encasing the fibers are fabricated in accordance with processes disclosed by H. E. Karlinski in U.S. Pat. #4,759,487 (7/26/87), which establishes the apparatus and method for forming the steel alloy tubes from flat metal tapes, injecting the optical fibers and gel-fill, laser welding the tube seam to obtain an hermetic seal, and reducing the latter to size.

A steel alloy tubular member having a 0.032" outer diameter is made from a 0.002–0.003" wall thickness stainless steel stock and a 0.065" outer diameter tubing member may be fabricated from 0.004–0.005" stock. These relative dimensions present a strong enough design to resist radially converging forces while allowing longitudinal flexibility, such that the cable can be stowed on a reel for later deployment over sheaves. Obviously, different diameters can be fabricated in accordance with methods of the cited patents, however, it was found that a diameter approximately equal to ten times the wall thickness provided sufficient crush resistance and sufficient longitudinal flexibility. T h e thin-walled tube designs protect the fibers from asymmetrical radial compression which would deform the shape of the fiber itself, and consequently, alter the fiber's index of refraction. It is this protection from shape deformation that assures the possibility of transmitting coherent optical phase data. The thin-walled steel alloy construction permits the precise application of a laser weld 20a longitudinally to hermetically seal the interior and provide a strong nearly integral protection for the fibers therein. The precision laser welding of the thin-walled steel alloy will not damage the fibers nor the void-fill gel during the fabrication process. This fact differs from results obtained with more highly heat conductive copper or copper alloy tubes that conduct excess heat away from the weld area. Copper and copper alloy tubes have not been laser welded successfully, however, they have been brazed or soldered with molten solder. The latter type of soldered seam limits the utility of the fiber encasing copper tube considerably. For example, the extruded dielectric region 25 surrounding the tube is usually processed at about 500° F, and this heat will soften and sometimes melt the solder. This destroys the hermetic integrity of the copper tube, and more catastrophically, may cause "break-a-ways" of the molten dielectric material during the extrusion operation, which can lead to breakage of both the fiber and the tube whenever the product jams in the extrusion head.

In laser welding of tubular members 20 constructed of a steel alloy material, the heat remains predominantly in the vicinity of the weld by passing through the laser beam quickly ( ~85 ft/sec). Hence, the fibers are not damaged in fabricating the specifically designed thin-walled tubular members 20.

The selection of the steel alloy tube also satisfies other design considerations of the cable. The elastic modulus of steel assures a strong, stable tube that can be handled and processed on conventional equipment at a cable plant without buckling. The elastic range of ~0.55% axial strain for the steel alloy is commensurate with the expected operational strain in this cable invention. The cable of this invention is specifically designed in accordance with features described below to protide low axial strain ( ~0.25%) at the working load, and low residual strain from creep ($\leq 0.15\%$). The thin-wall metal tube design facilitates the longitudinal laser weld 20a by reducing the total amount of heat needed to obtain seam fusion. In consequence of all of the above the enclosed fibers and gel are not disturbed, such that the gel provides frictional coupling for the fiber and the fiber functions without the risk of water flowing through the tube interior.

Figure 1A:
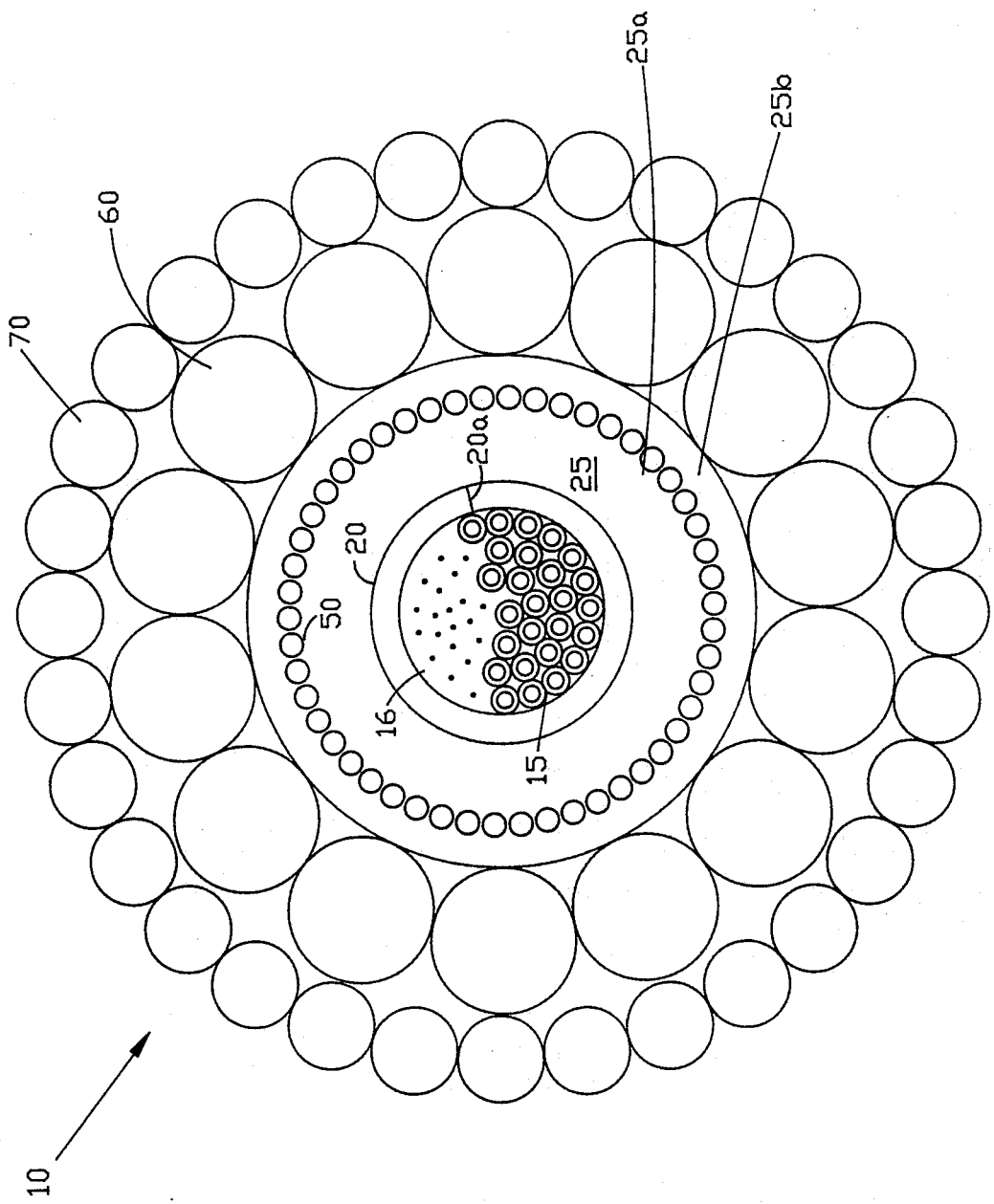
FIG. 1a shows a variation of FIG. 1.

Noting FIGS. 1 and 1a, an extruded dielectric region 25 contiguously abuts the outer surface of the metal tube 20. In FIG. 1a extruded dielectric region 25 has two sections, an inner section 25a and an outer section 25b, which sandwich an interposed served electrically conductive layer 50 which is described below. This same type extrusion is shown also in FIGS. 2a and 3. In FIG. 2 dielectric region 25 includes a strand shield portion 25' of a semi-conductive material such as semi-conductive ethylene-propylene copolymer and a second portion 25" of an insulative material such as medium-density polyethylene. Other materials can be used as well. The extrusion processes are in accordance with standard techniques in wire and cable fabrication. Noting FIG. 2a, an adhesive 20b optionally can be coextruded or extruded in tandem directly over the central E-O element and beneath the dielectric region when the latter would otherwise contact a smooth outer surface of the E-0 element to be covered. All of these disclosed configurations of the dielectric region have various advantages in the context of given cable performance requirements. The disclosed dielectric region configurations could be interchanged with the disclosed embodiments as a matter of design choice.

The heat normally attendant from such extrusion pocesses does not pose a threat to the integrity of the longitudinal welds 20a in the thin-walled tubing member. The materials chosen for the dielectric regions have been proven to provide excellent dielectric properties and very low moisture absorption and transmission. In addition to providing a desirable degree of electrical protection the dielectric regions protect the tube itself from corrosion and further buffer the internally carried fibers from distorting influences.

A served conductive layer 50 may be added as in FIGS. 1a, 2a, and 3 to give an electrical power and signal transfer capability, as required. The served electrical conductor layer 50 may be included in the designs to act as a ground shield or an electrical power return or may function as a second coaxial conductor to provide a shield for coaxial electrical data transmission. A pair of load bearing layers of wire strands 60 and 70 may complete a particular cable configuration. Optionally, FIG. 3b shows that alternate strands of layer 70' are deleted so that this layer can function as a spaced armor with about forty to seventy percent coverage. This reduces the torsional rigidity of the cable by providing the capability to absorb residual torsional stresses that arise in the cable du to the twisting that necessarily accompanies coiling of the cable into the holding tank of a cable laying ship. This modification can apply to the other disclosed embodiments, although this feature has not been shown in the other embodiments to avoid belaboring the obvious.

The embodiments of FIGS. 2 and 2a include some of the same elements as shown for FIGS. 1 and 1a. However, a plurality of served electrical conductors 40 are clustered about thin-walled tubular member 20 and longitudinally extend in a helical path in FIG. 2. As a variation, FIG. 2a displays shaped copper segments 40' that are stranded to fill an annulus about tubular member 20. In the embodiments of FIG. 2 the dielectric region 25 is made up of a semi-conductive strand shield portion 25' and a mediumdensity polyethylene insulative portion 25". In FIG. 2a an adhesive 20b is coated over the outer surface of the shaped copper segments 40' to adhere section 25 thereto for the purpose of shear transfer during cable cycling under tension.

Figure 3A:
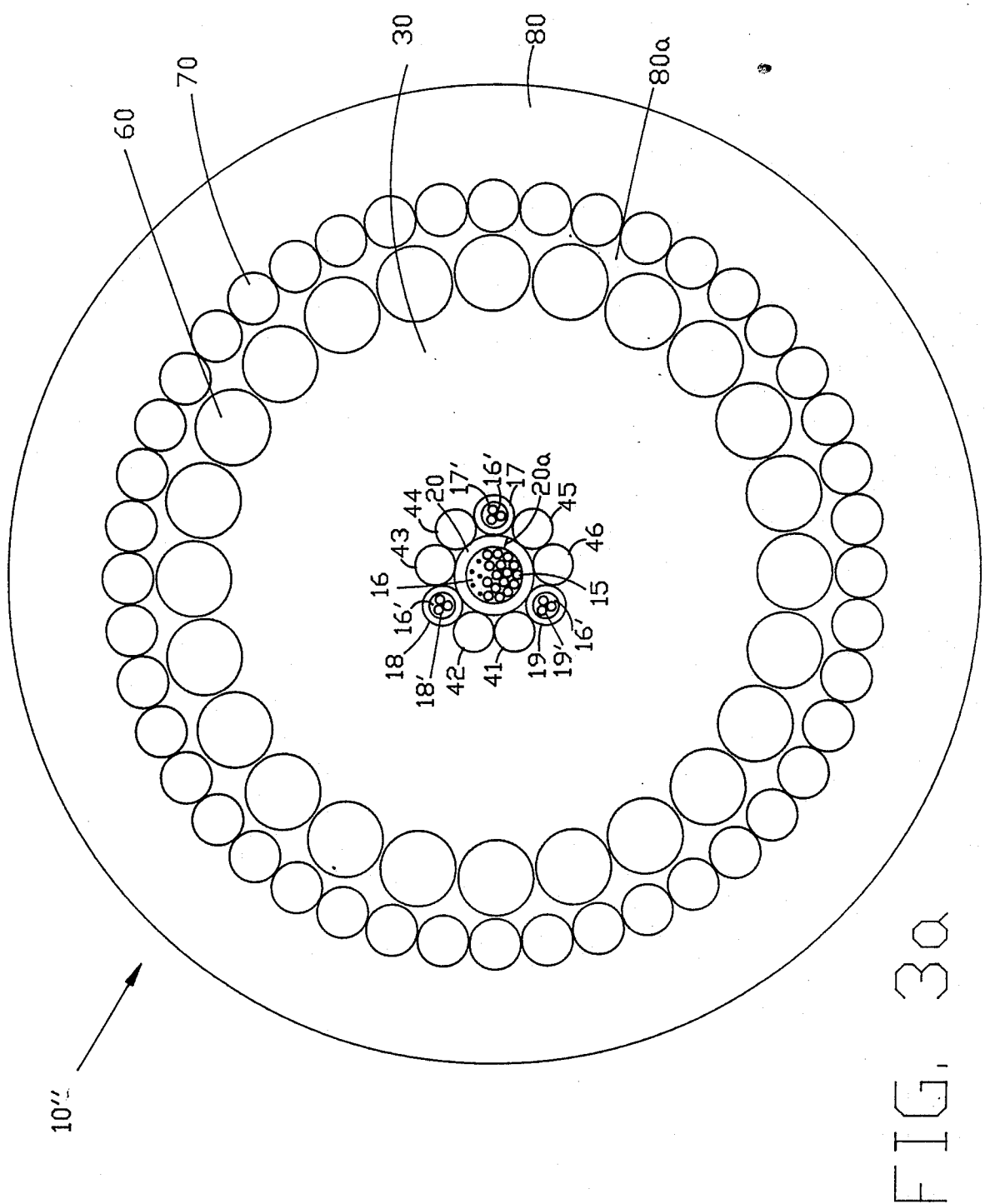
FIG. 3a shows a variation of FIG. 3.

The embodiments of FIGS. 3, 3a, and 3b show additional elements disposed in the extruded dielectric region 25 that gives this cable an enhanced electo-optic capability that might be useful when sensor requirements are expanded. Three additional thin-walled tubular members 17, 18, and 19 are shown disposed in an annulus about the central thin-walled tubular member 20. These additional members each contain additional fibers 17', 18', and 19' provided also with the void filling gel 16' and give the cable an increased optical channel capacity. Interspersed with the additional members are pairs of served electrical conductors 41–46. These are disposed in the same annulus as the additional thin-walled tubular members to give the cable a capability for transmitting power to various remote undersea repeaters, sensors, or other instrumentation as may arise. The three additional tubular members disclosed are not to be considered as restrictive on this inventive concept. Other ratios of the number of additional thin-walled tubular members to the number of additional electrical conductors can be selected as required.

Preferably, in FIGS. 3, 3a, and 3b, the dielectric region 25 fills the interstices around the additional tubular and electrical conductors to fill the cable interior and to provide mechanical coupling for the purpose of shear transfer.

As mentioned above, served electrically conductive layer 50 is included in the dielectric region of FIG. 3 to provide for a return lead or for additional transmission of electrical power as well as providing a degree of electronic shielding should it be necessary. The electrically conductive layer 50 can also be used in conjunction with the served electrical conductors 41–46 to provide a coaxial element for electrical data transmission.

A jacket 80 is provided as needed to protect the wires from point loading or strength degradation due to corrosion. An elastomeric filling compound 80a fills all interstices between adjacent wires and layers as required.

The served electrical conductors and the additional thin-walled tubular members which are clustered about the central thin walled tubular member longitudinally extend in a helical path about the central thin walled tubular member. The additional optical fibers 17′ 18′ and 19′ are each provided with an appropriately calculated back-twist to assure that torsional stress is not generated, which might otherwise compromise their phase modulated optical data transmission capability. This back-twist can be readily accomplished by methods well known to those skilled in the art to which this invention pertains.

At least two layers 60 and 70 of contrahelical, torquebalanced steel armor wires are located radially outwardly from the extruded annular dielectric region 25. Technical principles derived from physical laws using mathematical physics are used to determine the configuration of the double-steel armor layers as required to create an essentially torque-free cable that insures low cable rotation. A low magnitude of cable rotation, in general, produces a low displacement along the axis of the cable. Employing the force equilibrium equation and the equilibrium equation for force moments about the cable axis (induced by axial cable loading) and setting the resultants to zero, the size and number of wires in each of the two layers is determined by exact solution of a third order equation using Cardan's formula. The exact theoretical analysis can be relied upon to determine a given multiple layer armor design as set forth in the Stamnitz paper referenced above, so that the size and number of wires in each layer are precisely determined.

The manufacture of this cable invention requires the fabrication of thin-walled tubular members in general accordance with the technique disclosed in the above cited patent #4,759,487 which describes the method for including the desired number of single-mode optical fibers in the interior of the thin-walled tubular member (multi-mode fibers could be used however they are inappropriate for the transmission of phase coherent data). A thixotropic jel filling compound can simultaneously be flowed into the cylindrical enclosure while the tube is laser welded longitudinally to hermetically seal the seam to protect the interior contents from the external surroundings. This welding operation requires precision manufacturing apparatus and methods to prevent compromising the tube strength and to prevent damage to the optical fibers carried within.

The polyethylene dielectric 25 extruded over the tubular member does not present any problems in practice, since the laser weld produces complete closure of the metal tube seam. The extrusion of the high-density polyethylene having a temperature profile of about 500 degrees Fahrenheit does not produce sufficient "heat-mass" to disturb the laser welded seam on the thin-walled tubular member. The double-steel armor layers are appropriately mounted on the dielectric extrusion, while simultaneously filling with an elastomeric compound 80a both inner and outer interstices of all spaces that would otherwise be left void between adjacent armor wires in the same layers or in successive layers. The final jacket of high-density polyethylene 80 or an equivalent plastic or elastomer is pressure extruded to fill the outer interstices of the armor wires with portions 80b, in the outermost strand layer, see for example, FIGS. 2, 2a, 3, and 3a, and to cover the entire cable to provide mechanical coupling for the purpose of shear transfer. The integral nature of the outer jacket and the outer armor layer makes the cable even more impervious to the ambient operational effects; i.e., abrasion, temperature changes, hydrostatic pressure, etc.

The "spaced armor" provided by layer 70′ in the embodiment of FIG. 3b has portions 80b′ of the extruded jacket 80 filling the spaces between adjacent steel strands. This gives the cable a mechanical coupling of the jacket to the rest of the cable and reduces the cable torsional rigidity to allow cable coilability without loop formation or hockling. The load bearing strands in the spaced armor construction are supposed to be fabricated in a circumferentially symmetric arrangement with adjacent strands equidistantly spaced apart to provide partial coverage of the underlying layer of load bearing metallic strands. In actual practice, it is ordinarily difficult to maintain the precise equidistant spacing; hence, the latter is a design goal.

Obviously, many modifications and variations of the present invention are possible in light of the above teachings it is therefore to be understood that within the scope of the appended claims, the invention may be practiced otherwise than specifically described.

What is claimed is:

1. A cable having the capability for assuring the transmission of phase modulated optical data comprising:
    a central thin-walled tubular member longitudinally extending coincident in the axis of the cable with the tubular member made from a material having a compressive strength to resist radial inward deformation and having the property to permit longitudinal flexure and shaped with an outer diameter equal to a multiple of about ten times the dimensions of its wall thickness and having a longitudinal welded seam to provide an integral construction with a hermetically sealed interior;
    at least one optical fiber longitudinally disposed in said interior of the central thin walled tubular member;
    a gel filling said interior of the central thin walled tubular member containing said at least one optical fiber therein to remove any voids and to provide mechanical coupling between said optical fiber and the interior of said central thin-walled tubular member therein;
    an annular shaped dielectric region outwardly coaxial and adjacent said central thin walled tubular member and
    at least a pair of contrahelical layers of load bearing metallic strands disposed outwardly of the dielectric region providing an overall torque-balanced cable, said metallic strands being fabricated to allow the cable to be coiled, deployed, and retrieved without creating loop formation that leads to kinking (hockling) as said cable is tensioned.

2. A cable according to claim 1 in which said central thinwalled tubular member is a steel alloy material having the property and dimensions to prevent the transmission of sufficient heat to cause damage to said at least one optical fiber as said longitudinal welded seam in said central thin walled tubular member is precisely created by a laser.

3. A cable according to claim 2 further including:
    a served electrically conductive layer interposed in the annular shaped dielectric region longitudinally extending coaxially about said central thin walled tubular member;

an elastomeric compound disposed between at least adjacent layers of load bearing strands filling both inner and outer intersticies associated with the layers; and a pressure extruded external jacket filling all outer intersticial spaces between adjacent metallic strands in the outermost layer and covering the torque-balanced layers, said served electrically conductive layer, and said central thinwalled tubular member with said at least one optical fiber to provide an integrated electro-opto-mechanical cable structure.

4. A cable according to claim 2 or 3 further including:
at least one served electrical conductor clustered about and longitudinally extending in a helical path about said central thin-walled tubular member, said at least one served electrical conductor, said annular shaped dielectric region, said thinwalled tubular member with said at least one optical fiber and said torque-balanced layers providing an integrated electro-optomechanical cable structure.

5. A cable according to claim 2 or 3 further including:
at least one additional thin-walled tubular member fashioned like said central thin-walled tubular member and clustered about and longitudinally extending in a helical path about said central thin-walled tubular member;

a least one additional optical fiber longitudinally extending in each said additional thin-walled tubular member each provided with an appropriately calculated back-twist to offset the torsional stress induced in fabricating said helical path in each said additional optical fiber and assure said transmitting phase modulated optical data with low-noise;

a gel filling each said additional thin walled tubular member; and at least one served electrical conductor clustered about and longitudinally extending in a helical path about said central thin-walled tubular member, said annular shaped dielectric region being pressure extruded to assure covering said at least one additional thin walled tubular member and said at least one served electrical conductor such that the dielectric fills the outer interstices of the helically extending tubular members and electrical conductors.

6. A cable according to claim 5 in which each said at least one additional thin walled tubular member is alternated in a desired ratio with each said at least one served electrical conductor in an annulus said clustered about and longitudinally extending in said helical path about said central thin-walled tubular member.

7. A cable according to claim 4 in which said annular shaped dielectric region has a semi-conductive strand shield directly in contact with said at least one served electrical conductor and filling the outermost interstices of adjacent conductors and an insulative annulus adjacent to and in intimate contact with said semi-conductive strand shield.

8. A cable according to claim 5 in which said annular shaped dielectric region has a semi-conductive strand shield directly in contact with said at least one served electrical conductor and said at least one additional thin-walled tubular member and filling the outer interstices between said members and an insulative annulus adjacent to and in intimate contact with said semi-conductive strand shield.

9. A cable according to claim 1 further including:
an adhesive polymeric bonding material disposed on said central thin-walled tubular member to bond the annular shaped dielectric region thereto to provide an integral electro-opto-mechanical structure.

10. An apparatus according to claim 1, 2, or 3 in which the outer layer of load bearing metallic strands is fabricated in a circumferentially symmetric arrangement with adjacent strands equidistantly spaced apart to provide partial coverage of the underlying layer of load bearing metallic strands.

11. A cable according to claim 2 or 3 further including:
at least one served electrical conductor clustered about and longitudinally extending in a helical path about said central thin-walled tubular member, said at least one served electrical conductor, said annular shaped dielectric region, said thinwalled tubular member with said at least one optical fiber and said torque-balanced layers providing an integrated electro-opto-mechanical cable structure and in which the outer layer of load bearing metallic strands is fabricated in a circumferentially symmetric arrangement with adjacent strands equidistantly spaced apart to provide partial coverage of the underlying layer of load bearing metallic strands.

12. A cable according to claim 2 or 3 further including:
at least one additional thin-walled tubular member fashioned like said central thin-walled tubular member and clustered about and longitudinally extending in a helical path about said central thin-walled tubular member;

a least one additional optical fiber longitudinally extending in each said additional thin-walled tubular member each provided with an appropriately calculated back-twist to offset the torsional stress induced in fabricating said helical path in each said additional optical fiber and assure said transmitting phase modulated optical data with low-noise;

a gel filling each said additional thin walled tubular member; and at least one served electrical conductor clustered about and longitudinally extending in a helical path about said central thin-walled tubular member;

said annular shaped dielectric region being pressure extruded to assure covering said at least one additional thin walled tubular member and said at least one served electrical conductor such that the dielectric fills the outer interstices of the helically extending tubular members and electrical conductors and in which the outer layer of load bearing metallic strands is fabricated in a circumferentially symmetric arrangement with adjacent strands equidistantly spaced apart to provide partial coverage of the underlying layer of load bearing metallic strands.

13. An apparatus according to claim 4 further including:
an adhesive polymeric bonding material disposed on outer surfaces of said at least one served electrical conductor to bond the annular dielectric region thereto to provide an integral electro-opto-mechanical cable structure.

14. A method for assuring the transmission of low-noise optical phase data and, optionally, polarization data coming from a remote undersea fiber optic sensor system through a transmission medium whose construction requires the following steps:

hermetically enclosing optical transmission fibers of the transmission medium in a longitudinally extended steel alloy tubular member having a laser welded longitudinal seam;

filling the tubular member with an thixotropic polymeric void-full compound; and incorporating the hermeticly enclosing tubular member containing the optical transmission fibers and voidfill compound into a supporting cable structure that includes strength members formed from various combinations of copper alloys, steel alloys, synthetic fiber yarns, and fiber reinformed composite epoxy matrix materials; and, optionally, includes at least one electrical conductor.

* * * * *